(12) United States Patent
Xiao et al.

(10) Patent No.: US 11,989,502 B2
(45) Date of Patent: May 21, 2024

(54) IMPLICITLY ANNOTATING TEXTUAL DATA IN CONVERSATIONAL MESSAGING

(71) Applicant: Klaviyo, Inc, Boston, MA (US)

(72) Inventors: David Yi Xiao, Boston, MA (US); Smit Anish Kiri, Cambridge, MA (US); Tianxing Liu, Waltham, MA (US); Casey Koppes, Hermosa Beach, CA (US); Gabriel Gralla, Somerville, MA (US); Kaila Corrington, Cambridge, MA (US); Nithin Gangadharan, Boston, MA (US); Prisca Sara Joseph, Canton, MA (US); Robert Roosevelt Mercer, III, Raleigh, NC (US); Vera Guttenberger, Cambridge, MA (US); Andrew Cole Young, Young, MA (US)

(73) Assignee: Klaviyo, Inc, Boston, MA (US)

( * ) Notice: Subject to any disclaimer, the term of this patent is extended or adjusted under 35 U.S.C. 154(b) by 0 days.

(21) Appl. No.: 18/103,571

(22) Filed: Jan. 31, 2023

(65) Prior Publication Data
US 2023/0409817 A1 Dec. 21, 2023

Related U.S. Application Data

(60) Provisional application No. 63/353,569, filed on Jun. 18, 2022.

(51) Int. Cl.
*G06Q 30/02* (2023.01)
*G06F 3/0482* (2013.01)
*G06F 40/169* (2020.01)

(52) U.S. Cl.
CPC ......... *G06F 40/169* (2020.01); *G06F 3/0482* (2013.01); *G06Q 30/0281* (2013.01)

(58) Field of Classification Search
CPC .. G06F 40/169; G06F 3/0482; G06Q 30/0281
See application file for complete search history.

(56) References Cited

U.S. PATENT DOCUMENTS

| 6,917,965 | B2 | 1/2005 | Gupta et al. | |
|---|---|---|---|---|
| 7,162,690 | B2 | 1/2007 | Gupta et al. | |
| 8,792,863 | B2 | 7/2014 | De Oliveira et al. | |
| 10,484,542 | B1 * | 11/2019 | Rager | G06F 40/279 |
| 11,178,089 | B1 * | 11/2021 | Voss | H04L 51/42 |
| 2005/0105712 | A1 * | 5/2005 | Williams | G10L 13/027 |
| | | | | 704/275 |

(Continued)

*Primary Examiner* — Matthew Ell
*Assistant Examiner* — Samuel Shen
(74) *Attorney, Agent, or Firm* — Brian R Short

(57) ABSTRACT

Apparatuses, methods, and systems for implicitly annotating textual data in conversational messaging are disclosed. One method includes receiving, by a server, a first input text message from a user (customer), displaying, by the server, the first input text message to an agent (merchant), displaying, by the server, a configurable menu of responses to the first input text message to the agent (merchant), receiving, by the server, a selection of one of the configurable menu of responses from the agent (merchant), facilitating, by the server, sending of the selected of one of the configurable menu of responses to the user (customer); and associating and recording the selected one of the configurable menu of responses with the first input text message.

17 Claims, 9 Drawing Sheets

(56) References Cited

U.S. PATENT DOCUMENTS

| | | |
|---|---|---|
| 2012/0016661 A1 | 1/2012 | Pinkas |
| 2012/0084634 A1 | 4/2012 | Wong et al. |
| 2012/0240224 A1* | 9/2012 | Payne ................. H04L 63/1416 |
| | | 726/21 |
| 2014/0223284 A1 | 8/2014 | Ranklin, Jr. et al. |
| 2016/0285816 A1* | 9/2016 | Schmid ................... H04L 51/52 |
| 2018/0165723 A1* | 6/2018 | Wright .................... G06F 40/30 |
| 2019/0146647 A1* | 5/2019 | Ramchandran ......... G06F 40/35 |
| | | 715/758 |
| 2021/0073199 A1* | 3/2021 | Bettaglio ................. G06N 7/00 |
| 2022/0374956 A1* | 11/2022 | Jungmeisteris ...... G06Q 30/016 |

* cited by examiner

Alice receives message "Can I get a coupon" from Bob
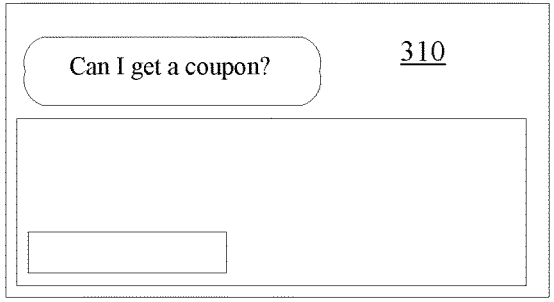
Alice selects "No coupons" response
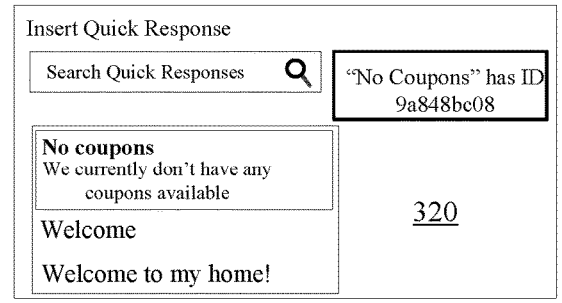
Alice sends response to Bob
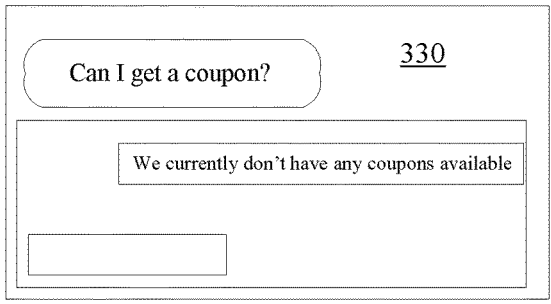
New Entry for annotated utterance added to data set
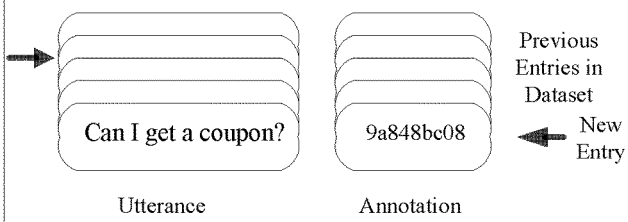
*FIG. 3*

SMS Conversation Quick Responses

Create custom templates for messages that are sent frequently

 

| Title | Message | Catagory | Status |
|---|---|---|---|
| Checkout help | Sure I can help with checkout. Could you tell me more about the issue please? | Checkout | Active |
| Coupon Issues | I'm happy to help you with your coupon | Coupon | Inactive |
| Coupon Request | Let me check if we have any available coupons | Coupon | Inactive |
| Free Shipping | Here is our shipping policy | Shipping | Inactive |
| Greatings | Hi there! | General | Inactive |
| Help | I am happy to help | General | Inactive |

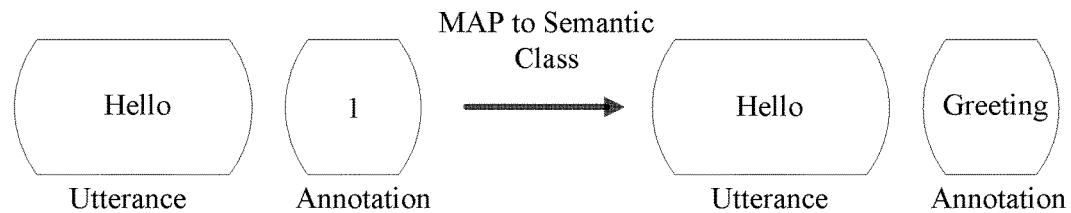

*FIG. 4*

IMPLICITLY ANNOTATING TEXTUAL DATA IN CONVERSATIONAL MESSAGING

RELATED PATENT APPLICATIONS

This patent application claims priority to Provisional Patent Application Ser. No. 63/353,569 filed Jun. 18, 2022, which is herein incorporated by reference.

FIELD OF THE DESCRIBED EMBODIMENTS

The described embodiments relate generally to intelligent electronic commerce. More particularly, the described embodiments relate to systems, methods, and apparatuses for implicitly annotating textual data in conversational messaging.

BACKGROUND

Supervised classification task models are trained using examples consisting of utterances (strings of text in a natural language such as English), and a label which classifies the utterance into one of several classes (commonly called intents in the literature). For example, the classification may be as simple as "Positive", "Negative", and "Neutral", and one wishes to classify individual utterances based on the sentiment therein. "Yay that's great" may be classified as "Positive" while "Terrible, just terrible" may be classified as "Negative". This is one simple example, and in general the classification ontology may be arbitrarily complex, with tens, hundreds, or more possible classes.

Using machine learning techniques, models can be trained that are able to successfully classify natural language utterances by feeding the machine learning algorithm with large data sets of utterance/label pairs. The machine learning algorithm then constructs models that are able to classify new, unseen examples with high accuracy. The accuracy of these algorithms improves as the amount of data fed to them grows, and so one of the main challenges in machine learning is to gather and maintain a large corpora of data.

Annotating utterances can be extremely costly since it requires a person to manually read and apply their judgment to produce a label. In this application we disclose a method to take advantage of a person using software they would be using anyway in order to annotate utterances, thereby providing a free source of annotated natural language data.

It is desirable to have methods, apparatuses, and systems for implicitly annotating textual data in conversational messaging.

SUMMARY

An embodiment includes a computer-implemented method of implicitly annotating textual data in conversational messaging. The method includes receiving, by a server, a first input text message from a user (customer), displaying, by the server, the first input text message to an agent (merchant), displaying, by the server, a configurable menu of responses to the first input text message to the agent (merchant), receiving, by the server, a selection of one of the configurable menu of responses from the agent (merchant), facilitating, by the server, sending of the selected of one of the configurable menu of responses to the user (customer); and associating and recording the selected one of the configurable menu of responses with the first input text message.

Another embodiment includes a system for implicitly annotating textual data in conversational messaging. The system includes a merchant server configured to operate and manage a website, a plurality of customer devices configured to provide input text messages, and a server electronically connected to the merchant server and the plurality of customer devices. For an embodiment, the server is configured to receive a first input text message from a user (customer), display the first input text message to an agent (merchant), display a configurable menu of responses to the first input text message to the agent (merchant), receive a selection of one of the configurable menu of responses from the agent (merchant), facilitate sending of the selected of one of the configurable menu of responses to the user (customer), and associate and record the selected one of the configurable menu of responses with the first input text message.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 shows a display that includes a merchant opening and selecting a common pre-written response to multiple input text messages (utterances) and adding to a dataset that includes utterance/ID pairs, according to an embodiment.

FIG. 4 shows a display that includes multiple responses for prompting the merchant, and further includes mapping opaque IDs to a semantic class, according to an embodiment.

DETAILED DESCRIPTION

Figure 1:
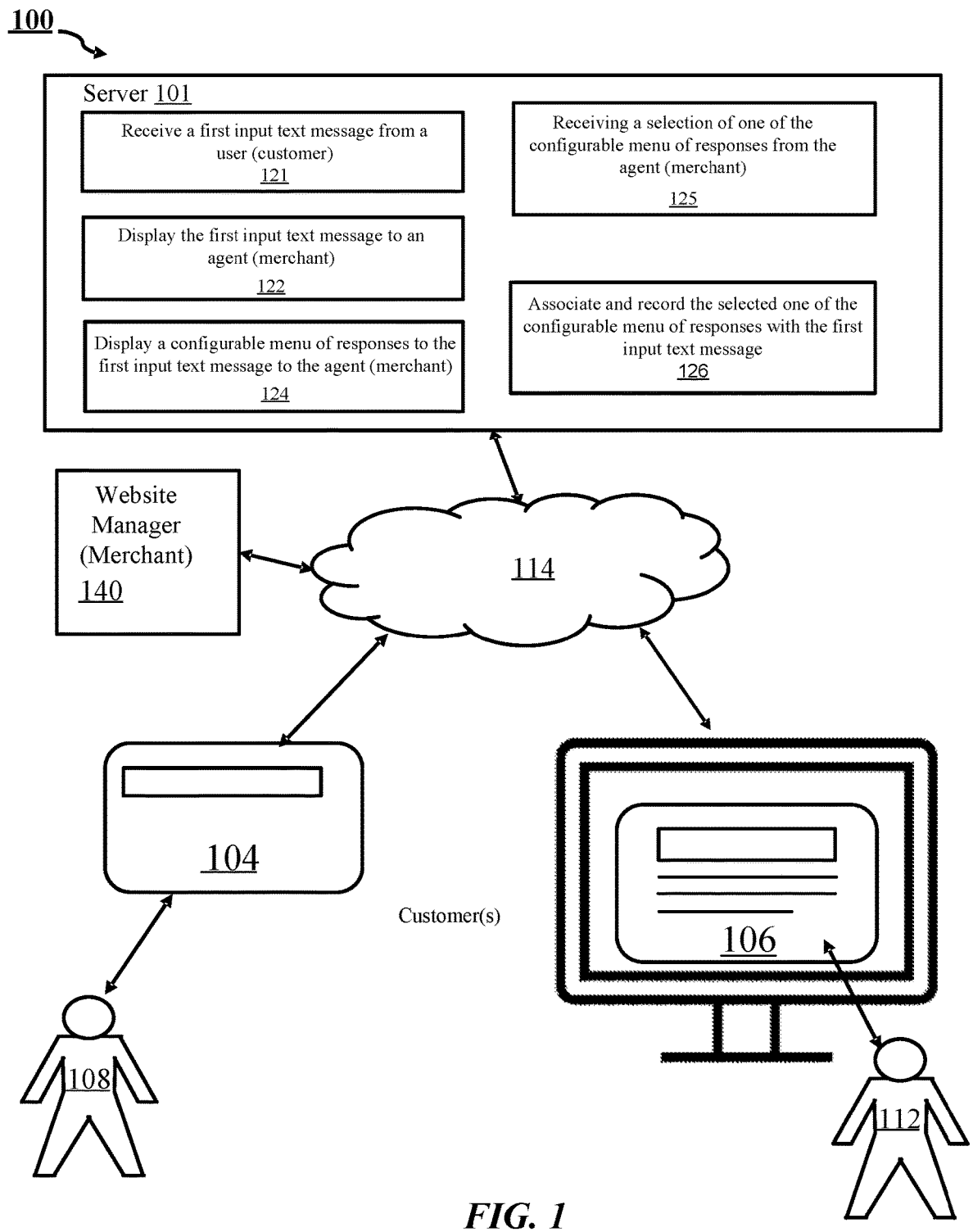
FIG. 1 shows a system for implicitly annotating textual data in conversational messaging, according to an embodiment.

FIG. 1 shows a system 100 for implicitly annotating textual data in conversational messaging, according to an embodiment. The system 100 includes a server 101. For an embodiment, the server 101 is electronically connected through a network 114 to a merchant server 140 of a merchant, and electronic devices 104, 106 of site visitors (customers of the merchant) 108, 112.

At least some of the described embodiments provide annotation generation for conversational data in 2-way messaging systems. Some exemplary 2-way messaging systems include SMS (Short Message Service), WhatsApp®, WeChat®, Facebook Messenger®, and similar platforms that enable 2-way textual communication. At least some of the described embodiments benefit operators of the server 101 by providing the 2-way messaging system and permitting the operator to collect annotations for utterances received through the system.

At least some of the described embodiments treat the two sides (for example, merchant and customer) of the messaging conversation asymmetrically. For descriptive purposes, the two parties to the conversation may be referred to as Alice and Bob. Suppose Company C operates the server 101 that Alice (for example, a merchant) is using to communicate with Bob (for example, a customer of the merchant A) via 2-way messaging. For an embodiment, Bob (customer) may also be using service of company C. At least some of the described embodiments enable Company C to use Alice's interactions with Bob's to collect annotations of Bob's messages. For at least some embodiments, the server 101 provides a way for Alice (merchant) to store and then select responses. For an embodiment, the responses are pre-written. For an embodiment, the responses are electronically generated.

For an embodiment, a merchant server 140 operates and manages a ecommerce website of the merchant. For an embodiment, the merchant server 140 includes a server of a business (the merchant) that operates to directly control the ecommerce website. For an embodiment, the merchant server 140 includes a combination of the business (merchant) and a third party to operate to control the ecommerce website. For an embodiment, the merchant of the merchant server 140 is a customer of the operator of the server 101. For an embodiment, the merchant server 140 is a combination of the customer of the operator of the server 101 and a third party (such as, a Shopify platform). For an embodiment, the merchant server includes one or more third party servers.

For an embodiment, the server 101 operates to receive 121 a first input text message from a user (customer), display 122 the first input text message to an agent (merchant), display 124 a configurable menu of responses to the first input text message to the agent (merchant), receive 125 a selection of one of the configurable menu of responses from the agent (merchant). For an embodiment, the server is configured to both facilitate sending the selected one of the configurable menu of responses to the user (customer) and associate and record 126 the selected one of the configurable menu of responses with the first input text message. For at least some of the described embodiments, the associating and recording is not visible to the user (customer). Further, for at least some embodiments, selecting the response from the menu includes an act of annotating the message of the user (customer), wherein the annotating includes associating and recording the link between the message of the user (customer) and the response of the agent (merchant). A primary point of uniqueness and value of the described embodiments is that the agent (merchant) is selecting the one of the configurable menu of responses to facilitate the sending of the one of the configurable menu of responses back to the user (customer) in response to the first input text message, but the server additionally associates and records the selected one of the configurable menu of responses with the first input text message. That is, the agent (merchant) is selecting the response from the configurable menu not with the intention of annotating the data, but with the intention of sending that response back to the user (customer). That is, generally annotating data (such as, the first input text message) is a very expensive labor-intensive process. However, the described embodiments advantageously take advantage of actions of the agent (merchant) to annotate the data (input text messages) based on the actions of the agent (merchant) selecting a response to the input text messages of the user (customer). While the agent may be a merchant and the user may be a customer of the merchant, it is to be understood that for at least some embodiments the agent and the user may have different relationships. For example, the agent and the user may be, for example, two individuals texting over say WhatsApp® or FB Messenger®, where there's no merchant/customer relationship.

For at least some embodiments, the server 101 further operates to receive a second input text message from one or more users (customers), receive the selection of the one of the configurable menu of responses from the agent which is the same as the response for the first input text message, and associate and record the same selected one of the configurable menu of responses with the second input text message. As described, a single response (label) is associated and recorded for both the first input text message and the second input text messages. That is, a single response (label) is associated with multiple input text messages (utterances).

For at least some embodiments, associating the selected one of the configurable menu of responses with the input text message includes assigning an ID to the selected one of the configurable menu of responses. At least some embodiments further include generating a plurality of annotated datasets based on associating each of the first input text message and the second input text message with the selected one of the configurable menu of responses having the assigned ID. For an embodiment, data annotation is a process of labeling data with relevant tags to make the data easier for computers to understand and interpret. This data can be in the form of images, text, audio, or video, and data annotators need to label it as accurately as possible.

Figure 2:
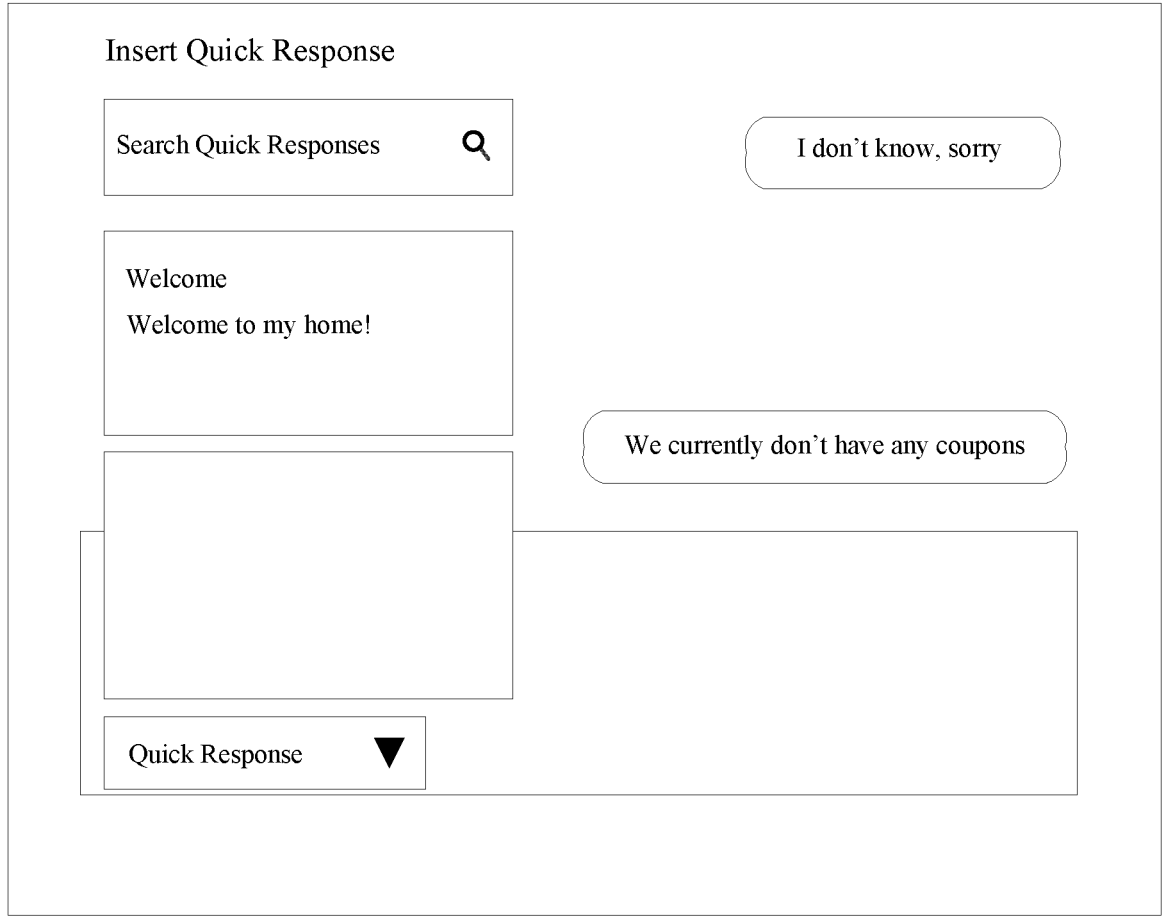
FIG. 2 shows a display that includes responses to an input text message, according to an embodiment.

FIG. 2 shows a display that includes responses to an input text message, according to an embodiment. For an embodiment, initially the configurable menu of responses includes pre-written responses. The display of FIG. 2 shows an example of the configurable menu of pre-written responses and the agent in the process of selecting a pre-written response. The pre-written responses can originate, for example, as an importation from a file from the merchant.

For an embodiment, the initially configurable menu of responses includes electrically generated responses. That is, the responses can be generated by a text generator, and then displayed. For an embodiment, the text generator includes a natural language processing model, such as, GPT-3®.

At least some embodiments further include training a natural language intent classification model based on the plurality of annotated datasets. For at least some embodiments, the natural language classification model provides suggested responses. For at least some embodiments, the natural language classification model provides automated responses which can then be provided for selection by the agent (merchant).

FIG. 3 shows a sequence of steps that includes a merchant opening and selecting a common pre-written response to multiple input text messages (utterances) and adding to a dataset that includes utterance/ID pairs, according to an embodiment. The sequence of the steps of FIG. 3 outlines the process of at least some of the described embodiments. The first step 310 includes receiving the input message ("Can I get a coupon) from the user (customer). The second step 320 includes receiving a select pre-written response ("We currently don't have any coupons available") from the agent (merchant). The third step 330 includes the selected pre-written response being provided to the user (customer). The fourth step 340 includes creating the association between the pre-written response's assigned ID and the input message. While described here as pre-written responses, as described, for other embodiments the responses are not pre-written, but can be, for example, generated in real-time.

For an embodiment, each response (for example, a pre-written response) is identified by a unique ID. One can think of this as an opaque ID such as an auto-incrementing integer or a UUID.

For an embodiment, when Alice (merchant) selects a pre-written response to reply to a message from Bob (customer), the server 101 links the unique ID representing the pre-written response to Bob's message and saves the unique ID to a database. For an embodiment, the ID is treated as the label. For an embodiment, when Alice (merchant) uses the same pre-written response in response to different messages, the same ID is associated with those messages. The resulting data set consists of utterance/ID pairs, where each utterance is a message from someone Alice (merchant) had a conversation with and the label is the ID of the pre-written response that Alice used to respond. For an embodiment, responses that did not use a pre-written response are not represented in the data set. This data set can be used as training data because Alice (merchant) uses the same pre-written response to two different messages. Therefore, it can be inferred that those two messages were of a similar nature and hence can be classified with the same ID.

FIG. 4 shows a display that includes multiple responses for prompting the merchant, and further includes mapping opaque IDs to a semantic class, according to an embodiment. For at least some of the described embodiments, the labels are opaque IDs. However, at least some embodiment further includes supporting a more semantically meaningful label. For example, if we have a pre-written response like "We don't ship to Canada" with ID 04938, and we see a bunch of messages tagged with this ID, then a person could manually inspect those messages as well as the pre-written response and assign the semantic label of "Ask if you ship to Canada" to messages labeled with the opaque ID 04938.

For an embodiment, semantic labels are added post hoc by manually identifying the meanings of the different labels, but it's also possible to attach semantic labels from a pre-existing classification ontology. There are several ways to incorporate pre-existing semantic meaning into the IDs. For an embodiment, an agent (merchant) is allowed to assign a unique human-readable title and use that as an ID. For example, if the pre-written response expresses "You're welcome" in a personalized way, then the agent (merchant) may save that pre-written response under the title "You're welcome".

For an embodiment, the server 101 assigns unique semantic titles by proactively suggesting different types of pre-written responses for Alice (merchant) to use. For example, as shown in FIG. 4, for an ontology that includes classes for "Greeting" and "Help" (these are classes for messages that Bob (customer) may send), then the server 101 can suggest to Alice to pre-write two responses, Pre-written Response 1 could be in response to "Greeting" messages and Pre-written Response 2 could be in response to "Help" messages. For an embodiment, those IDs (1 and 2) are then mapped to the classes "Greeting" and "Help" when being recorded in the data.

Figure 5:
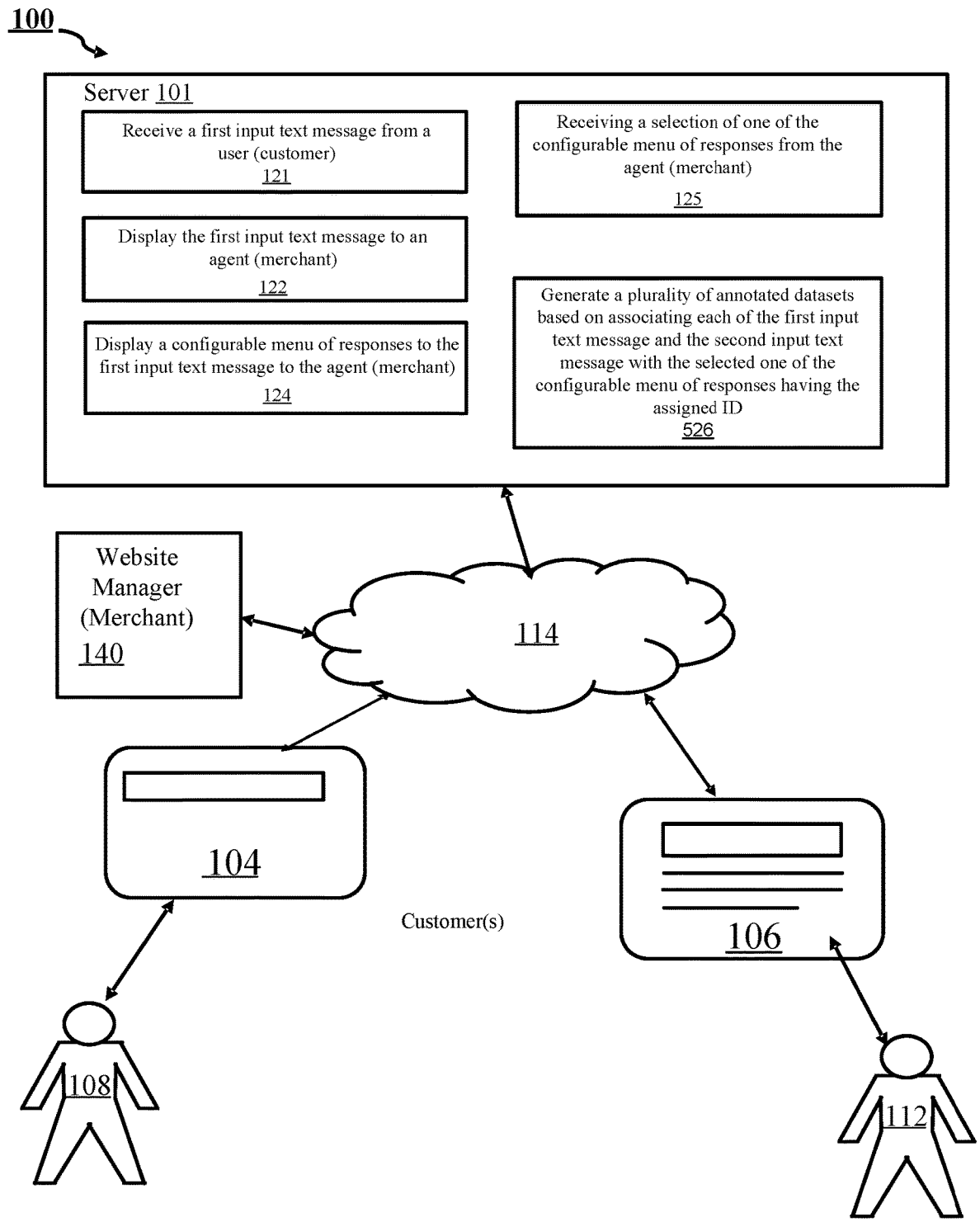
FIG. 5 shows a system for implicitly annotating textual data in conversational messaging, according to an embodiment.

FIG. 5 shows a system for implicitly annotating textual data in conversational messaging, according to an embodiment. For an embodiment, at least one ID of the responses includes additional semantic meaning which is displayed to the agent (merchant) providing the agent (merchant) with information regarding an intent of a response associated with the at least one ID. As shown, at least some embodiments include generating 526 a plurality of annotated datasets based on associating each of the first input text message and the second input text message with the selected one of the configurable menu of responses having the assigned ID. For an embodiment, data annotation is a process of labeling data with relevant tags to make the data used to train models that will compute the annotation on new data. This data can be in the form of images, text, audio, or video, and data annotators need to label the data as accurately as possible.

For at least some embodiment, labels associated with responses include labels that are opaque. However, at least some embodiments further include semantically meaningful label(s). For example, if a pre-written response includes something like "We don't ship to Canada" with ID 04938, and other messages are identified to be tagged with this ID, then a person could manually inspect those messages as well as the pre-written response and assign the semantic label of "Ask if you ship to Canada" to messages labeled with the opaque ID 04938.

As described, for an embodiment, the semantic labels are added post hoc by manually identifying the meanings of the different labels, but it's also possible to attach semantic labels from a pre-existing classification ontology. There are several ways to incorporate pre-existing semantic meaning into the IDs:

One method is to allow the user to assign a unique human-readable title and use that as an ID. For example, if the pre-written response expresses "You're welcome" in a personalized way, then the user may save that pre-written response under the title "You're welcome".

For an embodiment, the server 101 is configured to generate a look back window that determines a number N of input text messages received from the user (customer) that the assigned ID of the selected one of the configurable menu of responses is associated with. For an embodiment, the look back window doesn't determine what is displayed to the user (customer). Rather, the look back window determines how many messages received from the user (customer) are associated with the assigned ID of the merchant selected response. For example, the server may receive two different messages from the user (customer), such as, "I don't understand your product" or "It doesn't turn on for me". The selected response may be "I'm sorry to hear you're having trouble using our product". For an embodiment, that response is associated with both of the messages "I don't understand your product" and "It doesn't turn on for me".

Figure 6:
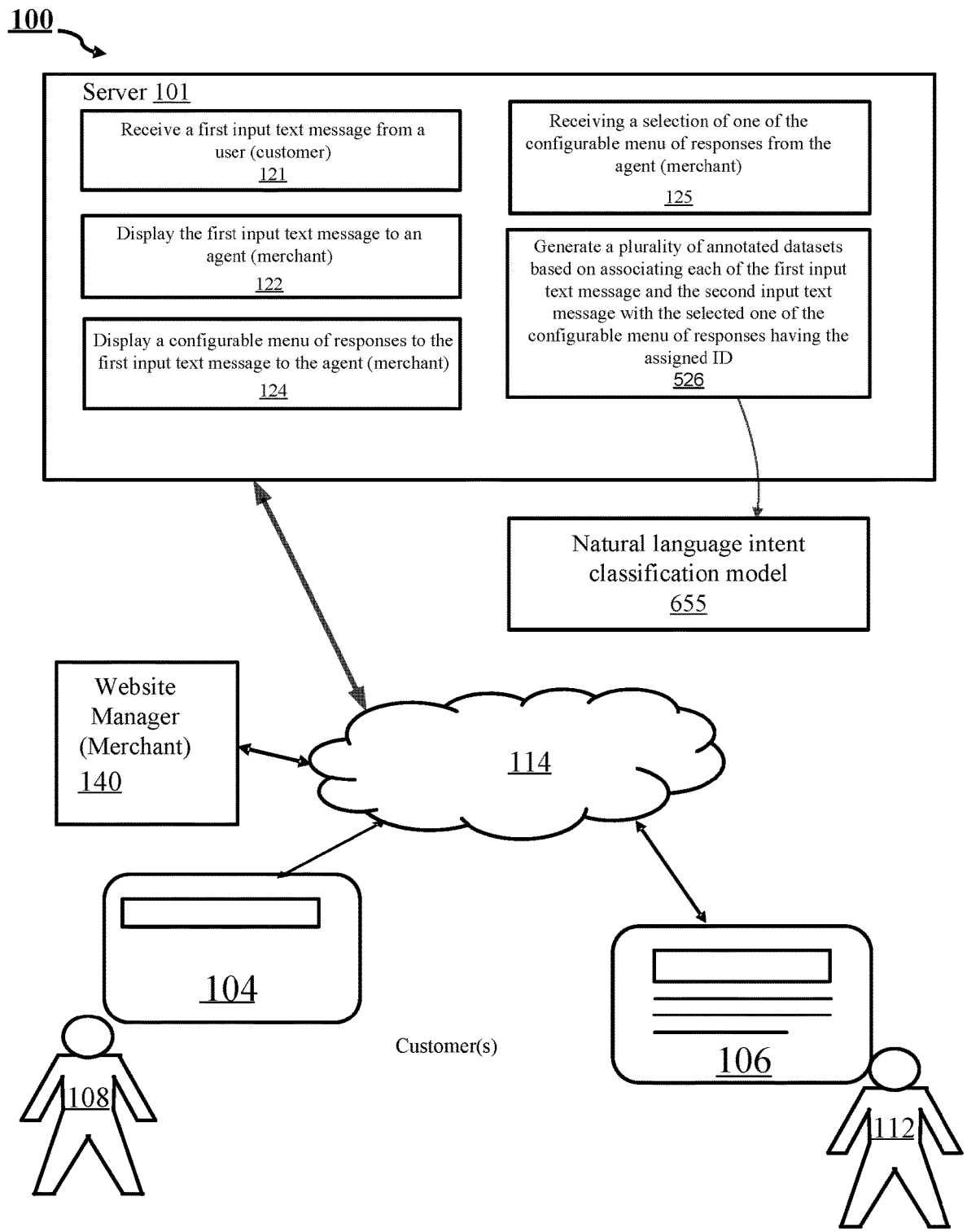
FIG. 6 shows a system for implicitly annotating textual data in conversational messaging, wherein the annotated datasets are used for fine-tuning a natural language intent classification model, according to an embodiment.

For an embodiment, the number N of input text messages of the look back window is selected or set based on identifying how quickly messages were sent one after another. For an embodiment, the lookback window includes all N messages that were sent within a selected amount of time (such as, 5 seconds) of each other. For an embodiment, the number N of input text message is determined based on identifying all user messages sent without an intervening agent message. That is, for an embodiment, N is dynamically selected based on the identifying how quickly messages were sent one after another, or based on identifying all user messages sent without an intervening agent message FIG. 6 shows a system for implicitly annotating textual data in conversational messaging, wherein the annotated datasets are used for training a natural language intent classification model, according to an embodiment. As shown, a natural language intent classification model 655 generates responses to a text message input. The responses are fed to the display of the menu of responses that can be selected by the agent (merchant). Further, the annotated responses 526 are fed back to the natural language intent classification model 655. It is to be understood that FIG. 6 shows an embodiment in which a natural language intent classification model 655 is trained and used for generating suggested or automated responses to the text input message. However, it is to be understood that other embodiments include other uses of the trained natural language intent classification model 655.

Figure 7:
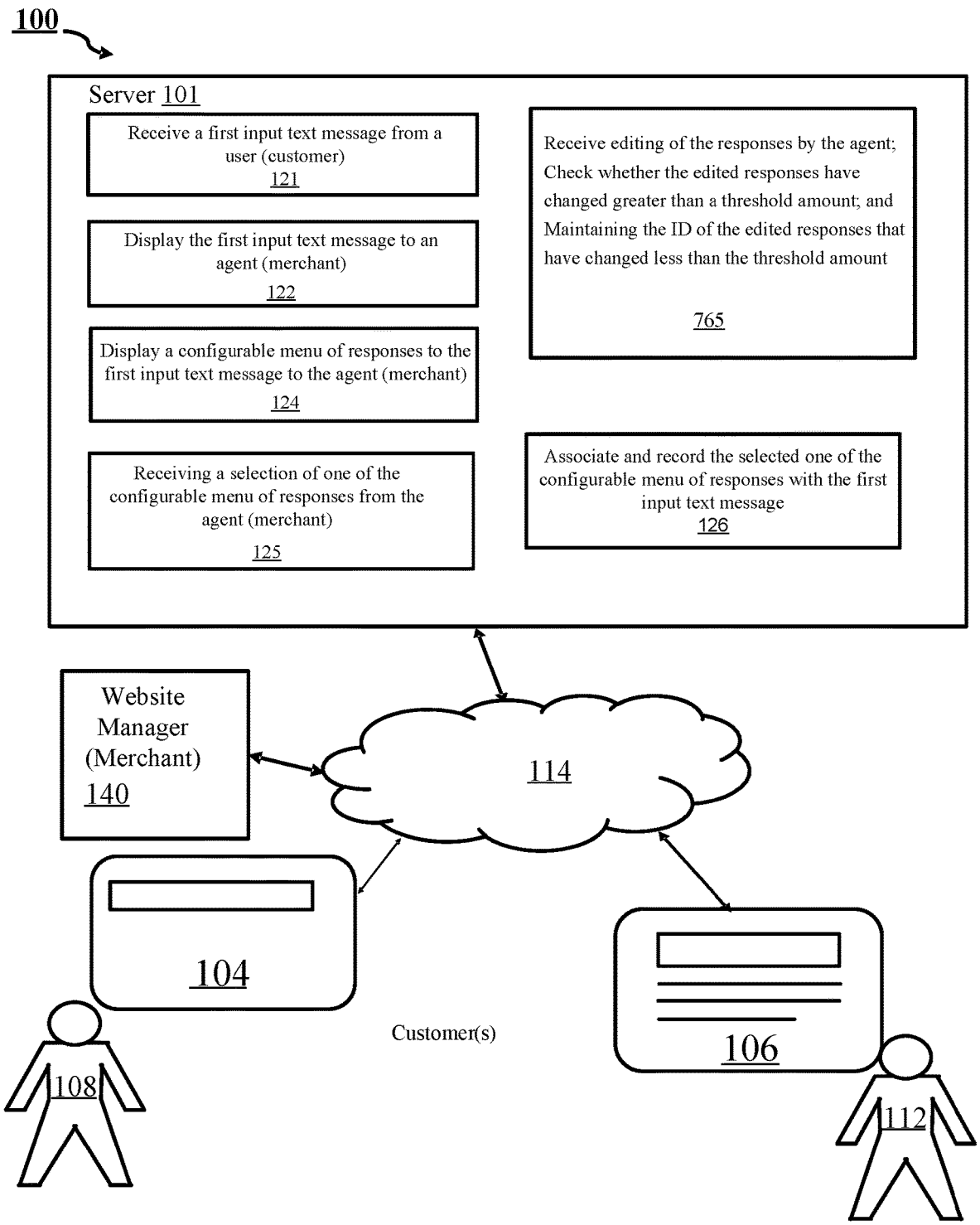
FIG. 7 shows a system for implicitly annotating textual data in conversational messaging wherein responses can be edited, according to an embodiment.

FIG. 7 shows a system for implicitly annotating textual data in conversational messaging wherein responses can be edited, according to an embodiment. For at least some embodiments, the responses may be edited 765 before being received by the server 101. For these embodiments, it is possible to have "false positives. That is, the agent (merchant) may select a response, but then edit the response so heavily that one can no longer infer that the message it's responding to corresponds to the same class as what the original response was intended to address. To reduce these false positives, at least some embodiments, include applying a variety of approaches to test that the final edited response that is received by the server is "close enough" to the selected response. Measures of closeness include but are not limited to Levenshtein distance or cosine similarity in an appropriate embedding space.

At least some embodiments include receiving, by the server, editing of the responses by the agent, checking, by the server, whether the edited responses have changed greater than a threshold (preselected) amount, and maintaining the ID of the edited responses that have changed less than the threshold amount. For an embodiment, the threshold is preselected based on a type of conversation classification of the merchant. For example, the conversation of the merchant may be classified as a customer service type or as a sale type. Accordingly, different threshold amounts can be adaptively selected based on the classification of the merchant. The amount of change of the edited response can be determined, for example, using different metrics, such as, edit distance.

Figure 8:
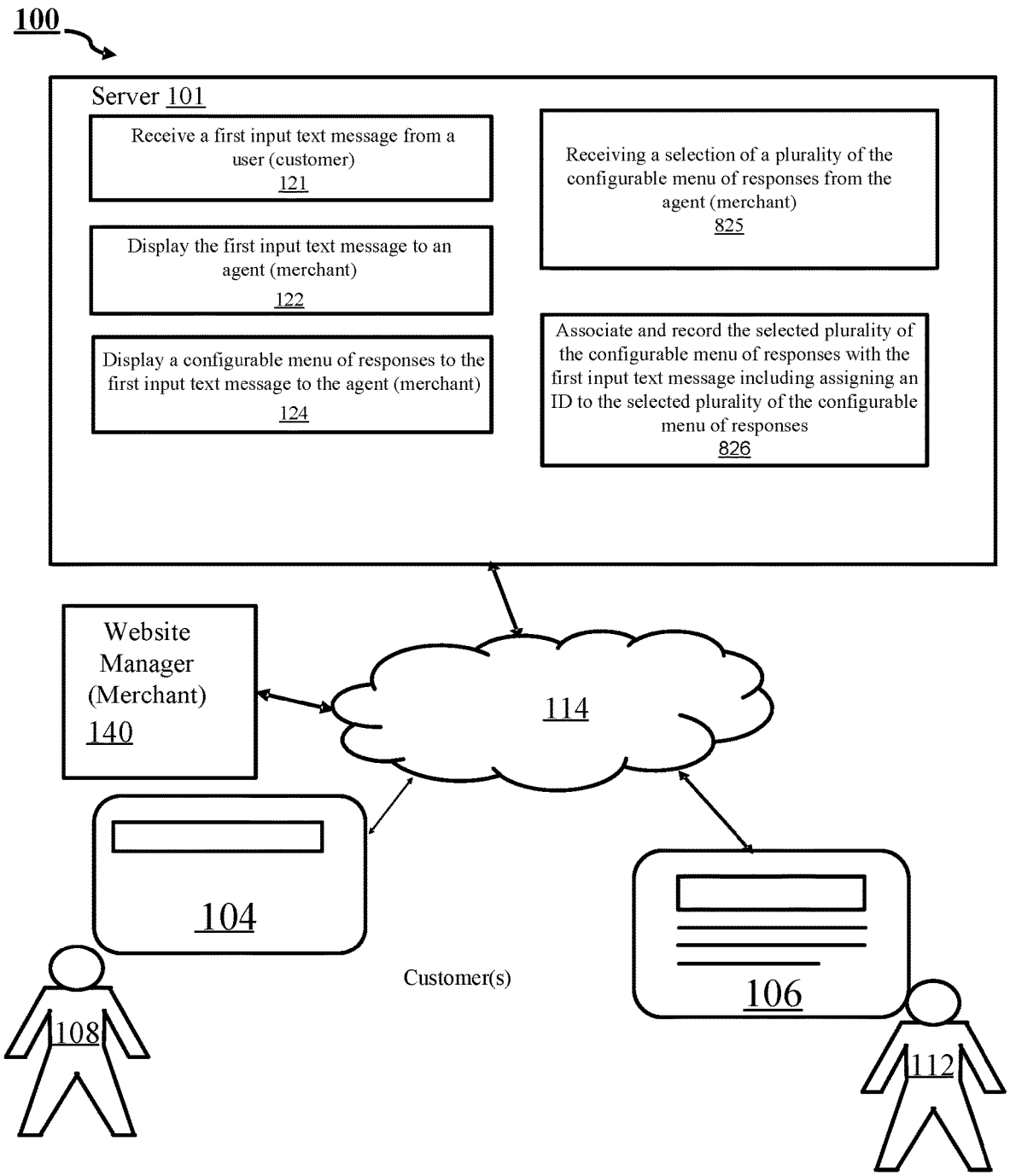
FIG. 8 shows a system for implicitly annotating textual data in conversational messaging wherein sequences or combinations of responses are associated and recorded for an input text message, according to an embodiment.

FIG. 8 shows a system for implicitly annotating textual data in conversational messaging wherein sequences or combinations of responses are associated and recorded for an input text message, according to an embodiment. For an embodiment, the server 101 is configured to receive 825 a selection of a plurality of the configurable menu of responses from the agent (merchant), and associate and record 826 the selected plurality of the configurable menu of responses with the first input text message. That is, multiple responses are selected by the merchant for a single input text message. Further, for an embodiment associating the selected plurality of the configurable menu of responses with the input text message includes assigning an ID to the selected plurality of the configurable menu of responses.

An embodiment includes more than a single response. In text conversations, people often break up single thoughts into multiple messages. Therefore, an embodiment includes more than one message in the lookback window. Such dynamic lookback windows may be set using a variety of techniques, such as including a fixed number of the most recent messages Alice sent, or a variable number of most recent messages Alice sent within a time threshold (e.g. within 1 minute of each other).

An embodiment includes excluding some of the most recent messages Alice (merchant) has sent. For example, Alice (merchant) may send multiple pre-written responses in a row to the same message from Bob (customer). It may therefore be beneficial to not associate certain pre-written messages with Bob's messages. The dynamic lookback windows may be set using a variety of techniques, such as only creating annotations based on the first pre-written response sent by Alice without any intervening messages from Bob, or only creating annotations based on the last pre-written response sent by Alice without any intervening messages from Bob in a sequence of pre-written responses. Another embodiment includes assigning each pre-written response a priority and associating with Bob's message the pre-written response with the highest priority in an uninterrupted sequence of pre-written responses from Alice. At least some embodiments further include selecting a sequence of the selected plurality of configurable menu of responses based on the first input text message. For an embodiment, the sequence is selected by the agent (merchant). At least some embodiments further include extracting annotations from the sequence including selecting a response of the sequence of configurable menu of responses based on priorities associated with each of the responses of the sequence of configurable menu of responses. At least some embodiments include rules for extracting annotations from these sequences. For example, certain responses may be considered to be less meaningful than others.

An embodiment includes more than one of the most recent messages the user (customer) has sent. In text conversations, people often break up single thoughts into multiple messages. Therefore, it may be better to include more than one message in the lookback window. Such dynamic lookback windows may be set using a variety of techniques, such as including a fixed number of the most recent messages Bob sent, or a variable number of most recent messages Bob sent within a time threshold (e.g. within 1 minute of each other).

Figure 9:
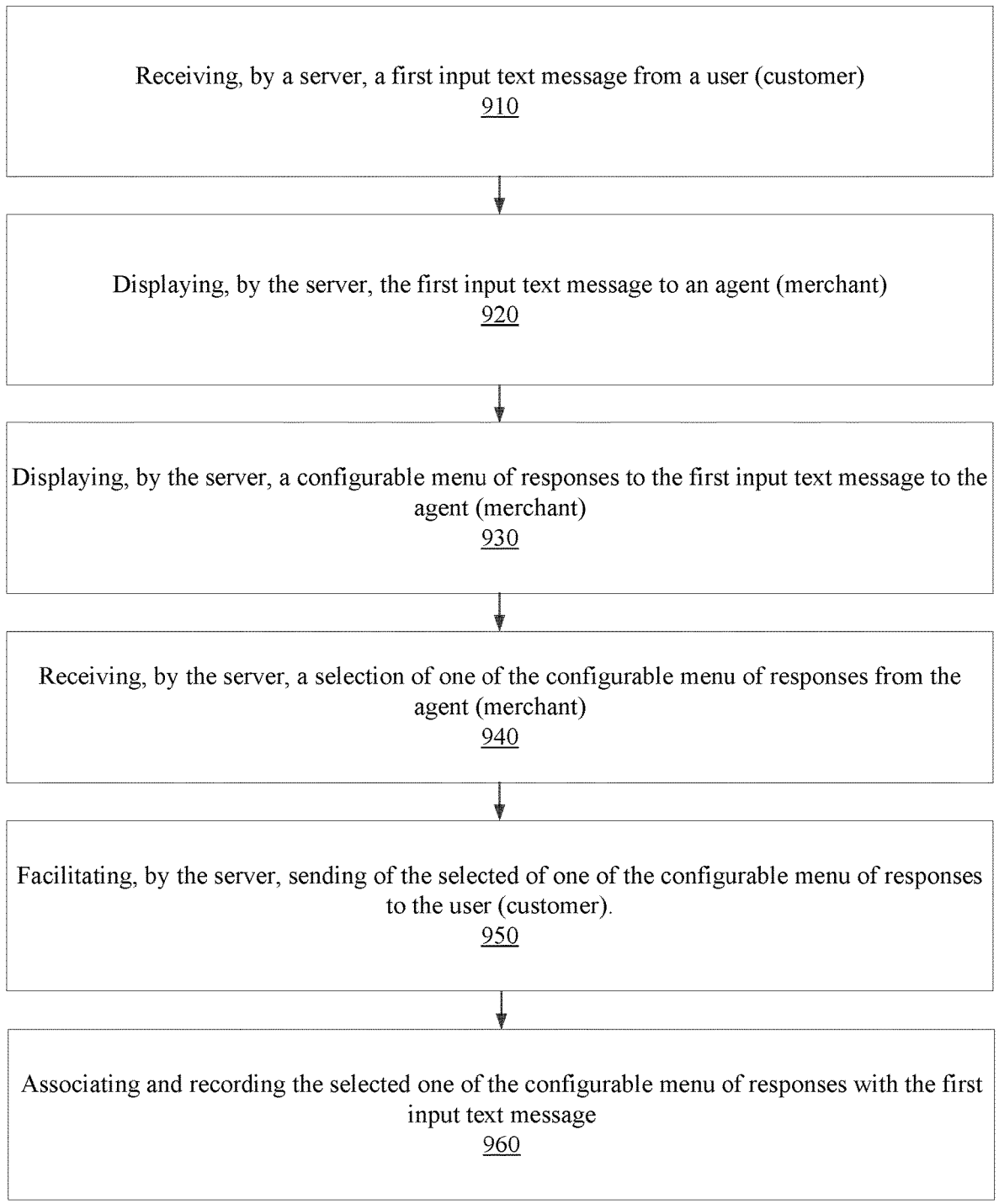
FIG. 9 is a flow chart that includes steps of a method of implicitly annotating textual data in conversational messaging, according to an embodiment.

FIG. 9 is a flow chart that includes steps of a method of implicitly annotating textual data in conversational messaging, according to an embodiment. A first step 910 includes receiving, by a server, a first input text message from a user (customer). A second step 920 includes displaying, by the server, the first input text message to an agent (merchant). A third step 930 includes displaying, by the server, a configurable menu of responses to the first input text message to the agent (merchant). A fourth step 940 includes receiving, by the server, a selection of one of the configurable menu of responses from the agent (merchant). A fifth step 950 includes facilitating, by the server, sending of the selected of one of the configurable menu of responses to the user (customer). A sixth step 960 includes associating and recording the selected one of the configurable menu of responses with the first input text message.

As previously described, a primary point of uniqueness and value of the described embodiments is that the agent (merchant) is selecting the one of the configurable menu of responses to facilitate the sending of the one of the configurable menu of responses back to the user (customer) in response to the first input text message, but the server additionally associates and records the selected one of the configurable menu of responses with the first input text message. That is, the agent (merchant) is selecting the response from the configurable menu not with the intention of annotating the data, but with the intention of sending that response back to the user (customer). That is, generally annotating data (such as, the first input text message) is a very expensive labor-intensive process. However, the described embodiments advantageously take advantage of actions of the agent (merchant) to annotate the data (input text messages) based on the actions of the agent (merchant) selecting a response to the input text messages of the user (customer).

For an embodiment associating and recording is not visible to the user (customer). For an embodiment, the selecting of the response from the menu is also an act of annotating the user's message. That is, selecting the response from the menu provides an associating and recording of the link between the user's message and the selected response.

At least some embodiments further include receiving, by the server, a second input text message from one or more users (customers), receiving, by the server, the selection of the one of the configurable menu of responses from the agent which is same as the response for the first input text message, and associating and recording the same selected one of the configurable menu of responses with the second input text message. That is, a single label is identified for multiple utterances. For an embodiment, associating the selected one of the configurable menu of responses with the first input text message and the second input text message comprises assigning an ID to the selected one of the configurable menu of responses.

At least some embodiments further include generating a plurality of annotated datasets based on associating each of the first input text message and the second input text message with the selected one of the configurable menu of responses having the assigned ID. For an embodiment, data annotation is a process of labeling data with relevant tags to make the data useful for training models that compute the annotation on new data. This data can be in the form of images, text, audio, or video, and data annotators need to label the data as accurately as possible.

As previously described, at least some embodiments further include fine-tuning a natural language intent classification model based on the plurality of annotated datasets. For an embodiment, the initially configurable menu of responses includes text word generated responses. That is, the responses can be generated by a text generator, and then displayed. For an embodiment, the text generator includes a natural language processing model.

At least some embodiments further include training a natural language intent classification model based on the plurality of annotated datasets. For at least some embodiments, the natural language classification model provides suggested responses. For at least some embodiments, the natural language classification model provides automated responses which can then be provided for selection by the agent (merchant).

As previously described, for at least some embodiments, initially the configurable menu of responses includes pre-written responses.

As previously described, for at least some embodiments, initially the configurable menu of responses includes text word generated responses.

As previously described, for at least some embodiments, at least one of the ID of the responses includes additional semantic meaning which is displayed to the agent (merchant) providing the agent (merchant) with information regarding an intent of a response associated with the at least one ID.

As previously described, at least some embodiments further include receiving, by the server, editing of the responses by the agent, checking, by the server, whether the edited responses have changed greater than a threshold amount, and maintaining the ID of the edited responses that have changed less than the threshold amount. For an embodiment, no association is made if changed greater than the threshold.

As previously described, at least some embodiments further include generating, by the server, a look back window that determines a number N of input text messages received from the user (customer) that the assigned ID of the selected one of the configurable menu of responses is associated with. As previously described, an embodiment includes generating a look back window that determines a number N of input text messages received from the user (customer) that the assigned ID of the selected one of the configurable menu of responses is associated with. For an embodiment, the look back window doesn't determine what is displayed to the user (customer). Rather, the look back window determines how many messages received from the user (customer) are associated with the assigned ID of the merchant selected response. For example, the server may receive two different messages from the user (customer), such as, "I don't understand your product" or "It doesn't turn on for me". The selected response may be "I'm sorry to hear you're having trouble using our product". For an embodiment, that response is associated with both of the messages "I don't understand your product" and "It doesn't turn on for me".

As described, for an embodiment, the number N of input text messages of the look back window is selected or set based on identifying how quickly messages were sent one after another. For an embodiment, the lookback window includes all N messages that were sent within a selected amount of time (such as, 5 seconds) of each other. For an embodiment, the number N of input text message is determined based on identifying all user messages sent without an intervening agent message. That is, for an embodiment, N is dynamically selected based on identifying how quickly messages were sent one after another, or based on identifying all user messages sent without an intervening agent message.

At least some embodiments further include receiving, by the server, a selection of a plurality of the configurable menu of responses from the agent (merchant) and associating and recording the selected plurality of the configurable menu of responses with the first input text message. For an embodiment, associating the selected plurality of the configurable menu of responses with the first input text message includes assigning an ID to the selected plurality of the configurable menu of responses.

For an embodiment, the agent (merchant) may send multiple pre-written responses in a row to the same message from the user (customer). It may therefore be beneficial to not associate certain pre-written messages with messages of the user (customer). Such dynamic lookback windows may be set using a variety of techniques, such as only creating annotations based on the first pre-written response sent by agent (merchant) without any intervening messages from the user (customer) or only creating annotations based on the last pre-written response sent by agent (merchant) without any intervening messages from user (customer) in a sequence of pre-written responses.

For example, the agent (merchant) may select 3 pre-written responses, such as, Response 1: "I'll check your account status", Response 2: "I'll talk to our shipping and handling partner", and Response 3: "One second while I look into this". When the user (customer) submits the input text messages of "Where's my order", the agent (merchant)

responds with Response 3, then Response 2. When the user (customer) submits the input text messages of "My account is locked", the agent (merchant) responds with Response 3, then Response 1.

At least some embodiments further include selecting a sequence of the selected plurality of configurable menu of responses based on the first input text message. For an embodiment, the sequence is selected by the agent (merchant). At least some embodiments further include extracting annotations from the sequence including selecting a response of the sequence of configurable menu of responses based on priorities associated with each of the responses of the sequence of configurable menu of responses. At least some embodiments include rules for extracting annotations from these sequences. For example, certain responses may be considered to be less meaningful than others. In the example above, Response 3 is less meaningful than Responses 1 and 2. Therefore, input text messages associated with the sequence of Response 3+Response 1, may be modified to only be associated with Response 1. Similarly, input text messages associated with the sequence Response 3+Response 2, may be modified to only be associated with Response 2. An embodiment includes having different priorities among the different responses, and choosing or selecting to only associate using the highest priority response in a sequence.

Although specific embodiments have been described and illustrated, the embodiments are not to be limited to the specific forms or arrangements of parts so described and illustrated. The described embodiments are to only be limited by the claims.

What is claimed is:

1. A method, comprising:
    receiving, by a server, a first input text message from a user (customer);
    displaying, by the server, the first input text message to an agent (merchant);
    displaying, by the server, a configurable menu of responses to the first input text message to the agent (merchant), wherein a natural language intent classification model generates at least one response of the configurable menu of responses;
    receiving, by the server, a selection of one of the configurable menu of responses from the agent (merchant);
    facilitating, by the server, sending of the selected of one of the configurable menu of responses to the user (customer);
    associating and recording the selected one of the configurable menu of responses with the first input text message;
    assigning an ID to the selected one of the configurable menu of responses;
    generating a plurality of annotated datasets based at least on associating the first input text message with the selected one of the configurable menu of responses having the assigned ID, wherein generating the annotated datasets include labeling data with relevant tags for training the natural language intent classification model;
    training the natural language intent classification model based on the plurality of annotated datasets;
    receiving, by the server, editing of the selected of one of the configurable menu of responses by the agent;
    selecting a change threshold of the edited selected of one of the configurable responses based on a type of conversation classification of the agent, wherein the type of classification includes at least a customer service type or a sale type;
    checking, by the server, whether the edited selected of one of the configurable responses has changed greater than the change threshold, comprising checking an edit distance between the selected one of the configurable menu of responses and the edited selected one of the configurable menu of responses; and
    maintaining the ID of the edited selected of one of the configurable responses when changed less than the change threshold.

2. The method of claim 1, further comprising:
    receiving, by the server, a second input text message from one or more users (customers);
    receiving, by the server, the selection of the one of the configurable menu of responses from the agent which is same as the response for the first input text message; and
    associating and recording the same selected one of the configurable menu of responses with the second input text message.

3. The method of claim 2, wherein associating the selected one of the configurable menu of responses with the first input text message and the second input text message comprises assigning the ID to the selected one of the configurable menu of responses.

4. The method of claim 3, further comprising generating the plurality of annotated datasets based on associating each of the first input text message and the second input text message with the selected one of the configurable menu of responses having the assigned ID.

5. The method of claim 3, wherein at least one of the ID of the responses includes additional semantic meaning which is displayed to the agent (merchant) providing the agent (merchant) with information regarding an intent of a response associated with the at least one ID.

6. The method of claim 3, further comprising:
    generating, by the server, a look back window that determines a number N of input text messages received from the user (customer) that the assigned ID of the selected one of the configurable menu of responses is associated with, wherein N is dynamically adjusted based on a number of text messages received from the user within a selected fixed time threshold without an intervening agent response, and based on identifying how quickly input text messages were sent one after another without an intervening agent response.

7. The method of claim 1, wherein initially the configurable menu of responses includes pre-written responses.

8. The method of claim 1, wherein the configurable menu of response includes electrically generated responses.

9. The method of claim 1, further comprising:
    receiving, by the server, a selection of a plurality of the configurable menu of responses from the agent (merchant) without any intervening input text messages; and
    associating and recording the selected plurality of the configurable menu of responses without any intervening input text messages with the first input text message;
    wherein first input text message includes a single input text message, and the plurality of configurable menu responses without any intervening input text messages are selected for the single input text message of the first input text message.

10. The method of claim 9, wherein associating the selected plurality of the configurable menu of responses without any intervening input text messages with the first input text message comprises assigning the ID to the selected plurality of the configurable menu of responses without any intervening input text messages.

11. The method of claim 10, further comprising selecting a sequence of the selected plurality of configurable menu of responses without any intervening input text messages by the agent based on the single input text message of the first input text message.

12. The method of claim 11, further comprising extracting annotations from the sequence of the selected plurality of configurable menu of responses without any intervening input text messages including selecting a response of the sequence of configurable menu of responses without any intervening input text messages based on priorities associated with each of the responses of the sequence of configurable menu of responses, wherein different responses of the sequence of configurable menu of responses without any intervening input text messages have different priorities and selecting to associate with the first input text message using the highest priority response in an uninterrupted sequence of configurable menu of responses without any intervening input text messages.

13. A system for implicitly annotating textual data in conversational messaging, comprising:
   a merchant server configured to operate and manage a website;
   a plurality of customer devices configured to provide input text messages; and
   a physical server electronically connected to the merchant serve rand the plurality of customer devices, the server configured to:
   receive a first input text message from a user (customer);
   display the first input text message to an agent (merchant);
   display a configurable menu of responses to the first input text message to the agent (merchant), wherein a natural language intent classification model generates at least one response of the configurable menu of responses;
   receive a selection of one of the configurable menu of responses from the agent (merchant);
   facilitate sending of the selected of one of the configurable menu of responses to the user (customer);
   associate and record the selected one of the configurable menu of responses with the first input text message;
   assign an ID to the selected one of the configurable menu of responses;
   generate a plurality of annotated datasets based at least on associating the first input text message with the selected one of the configurable menu of responses having the assigned ID, wherein generating the annotated datasets include labeling data with relevant tags for training the natural language intent classification model;
   train the natural language intent classification model based on the plurality of annotated datasets;
   receive editing of the selected of one of the configurable menu of responses by the agent;
   select a change threshold of the edited responses based on a type of conversation classification of the agent (merchant), wherein the type of classification includes at least a customer service type or a sale type;
   check whether the edited responses have changed greater than the change threshold, comprising checking an edit distance between the selected one of the configurable menu of responses and the edited selected one of the configurable menu of responses; and
   maintain the ID of the edited responses that have changed less than the change threshold.

14. The system of claim 13, wherein the server is further configured to:
   receive a second input text message from one or more users (customers); receive the selection of the one of the configurable menu of responses from the agent which is same as the response for the first input text message; and
   associate and record the same selected one of the configurable menu of responses with the second input text message.

15. The system of claim 14 wherein associating the selected one of the configurable menu of responses with the first input text message and the second input text message comprises assigning the ID to the selected one of the configurable menu of responses.

16. The system of claim 15, wherein the server is further configured to:
   generate the plurality of annotated datasets based on associating each of the first input text message and the second input text message with the selected one of the configurable menu of responses having the assigned ID.

17. The system of claim 13, wherein the server is further configured to:
   receive a selection of a plurality of the configurable menu of responses without any intervening input text messages from the agent (merchant);
   associate and record the selected plurality of the configurable menu of responses without any intervening input text messages with the first input text message, wherein first input text message includes a single input text message, and the plurality of configurable menu responses without any intervening input text messages are selected for the single input text message of the first input text message; and
   extracting annotations from the sequence including selecting a response of the sequence of configurable menu of responses without any intervening input text messages based on priorities associated with each of the responses of the sequence of configurable menu of responses, wherein different responses of the sequence of configurable menu of responses have different priorities, and selecting to associate with the first input text message using the highest priority response in an uninterrupted sequence of configurable menu of responses without any intervening input text messages.

* * * * *